(12) United States Patent
Labulle et al.

(10) Patent No.: US 11,440,816 B2
(45) Date of Patent: Sep. 13, 2022

(54) SANITISING SEAWATER AT SUBSEA LOCATIONS

(71) Applicant: Subsea 7 (US) LLC, Houston, TX (US)

(72) Inventors: Olivier Benjamin Labulle, Houston, TX (US); Hans Anton Kros, Cypress, TX (US); Christopher Stephen Mancini, Magnolia, TX (US)

(73) Assignee: Subsea 7 Norway AS, Stavanger (NO)

( * ) Notice: Subject to any disclaimer, the term of this patent is extended or adjusted under 35 U.S.C. 154(b) by 32 days.

(21) Appl. No.: 16/455,415

(22) Filed: Jun. 27, 2019

(65) Prior Publication Data

US 2020/0002192 A1 Jan. 2, 2020

(30) Foreign Application Priority Data

Jun. 28, 2018 (GB) ..................................... 1810646

(51) Int. Cl.
*C02F 1/32* (2006.01)
*C02F 103/00* (2006.01)
*C02F 103/08* (2006.01)

(52) U.S. Cl.
CPC ........ *C02F 1/325* (2013.01); *C02F 2103/008* (2013.01); *C02F 2103/08* (2013.01);
(Continued)

(58) Field of Classification Search
CPC ...... C02F 1/325; C02F 1/32; C02F 2103/008; C02F 2103/08; C02F 2201/004; C02F 2201/005; C02F 2201/32; C02F 2201/3222; C02F 2201/328; C02F 2303/04; C02F 2301/028; C02F 1/30; C02F 1/78; C02F 1/44; C02F 1/441; C02F 2103/42; C02F 9/00; E21B 43/20; E21B 41/00; E21B 41/0007; E04H 4/1209; E04H 4/12; B01D 61/027; F04D 25/0686; F04D 13/08; F04D 13/12; F04D 3/00; F04D 1/00; F04B 17/03; F03B 11/00; F03B 11/004
(Continued)

(56) References Cited

U.S. PATENT DOCUMENTS 7,731,843 B2 6/2010 Pinchin
2005/0263444 A1 12/2005 Baca et al.
(Continued)

FOREIGN PATENT DOCUMENTS

JP 2006255596 9/2006
WO WO 97/30268 8/1997
(Continued)

*Primary Examiner* — Akash K Varma
(74) *Attorney, Agent, or Firm* — Levy & Grandinetti

(57) ABSTRACT

A method of sanitising seawater at a subsea location comprises: exposing flow of seawater in a treatment reactor to UV radiation that sanitises the seawater without the addition of sanitising chemicals; and outputting the sanitised seawater from the reactor into a subsea structure such as a pipeline or a wellhead. The flow of seawater may be exposed to successive emitters of UV radiation such as pressure-compensated LEDs. The efficacy of sanitisation may be determined by: injecting a tracer fluid into the flow of seawater upstream of the reactor; and, downstream of the reactor, sensing transformation of the tracer fluid due to exposure of the tracer fluid to the UV radiation in the reactor.

18 Claims, 1 Drawing Sheet

(52) U.S. Cl.
 CPC .. *C02F 2201/004* (2013.01); *C02F 2201/005* (2013.01); *C02F 2303/04* (2013.01)
(58) Field of Classification Search
 USPC .................................................. 210/748.11
 See application file for complete search history.

(56) References Cited

U.S. PATENT DOCUMENTS

| | | | |
|---|---|---|---|
| 2006/0243670 A1* | 11/2006 | Pinchin | E21B 43/20 |
| | | | 210/748.11 |
| 2011/0166046 A1* | 7/2011 | Weaver | C02F 1/325 |
| | | | 507/101 |
| 2014/0263090 A1 | 9/2014 | Yencho | |
| 2015/0104328 A1* | 4/2015 | Babbitt | C02F 1/44 |
| | | | 417/2 |
| 2015/0210564 A1 | 7/2015 | Inoue et al. | |
| 2016/0347635 A1* | 12/2016 | Gruber | C02F 1/78 |
| 2018/0194658 A1* | 7/2018 | Plasencia | C02F 9/00 |
| 2021/0122650 A1 | 4/2021 | Taghipour | |

FOREIGN PATENT DOCUMENTS

| | | | |
|---|---|---|---|
| WO | WO 2004/090284 | 10/2004 | |
| WO | WO 2011/049546 | 4/2011 | |
| WO | WO 2011/083307 | 7/2011 | |
| WO | WO 2013/168745 | 11/2013 | |
| WO | WO 2014/044976 | 3/2014 | |
| WO | WO 2014/044978 | 3/2014 | |
| WO | WO 2015/024005 | 2/2015 | |
| WO | WO 2016/166248 | 10/2016 | |
| WO | WO 2017/001567 | 1/2017 | |
| WO | WO 2017/001567 A1 * | 1/2017 | ............... C02F 1/30 |
| WO | WO 2017/124191 | 7/2017 | |

* cited by examiner

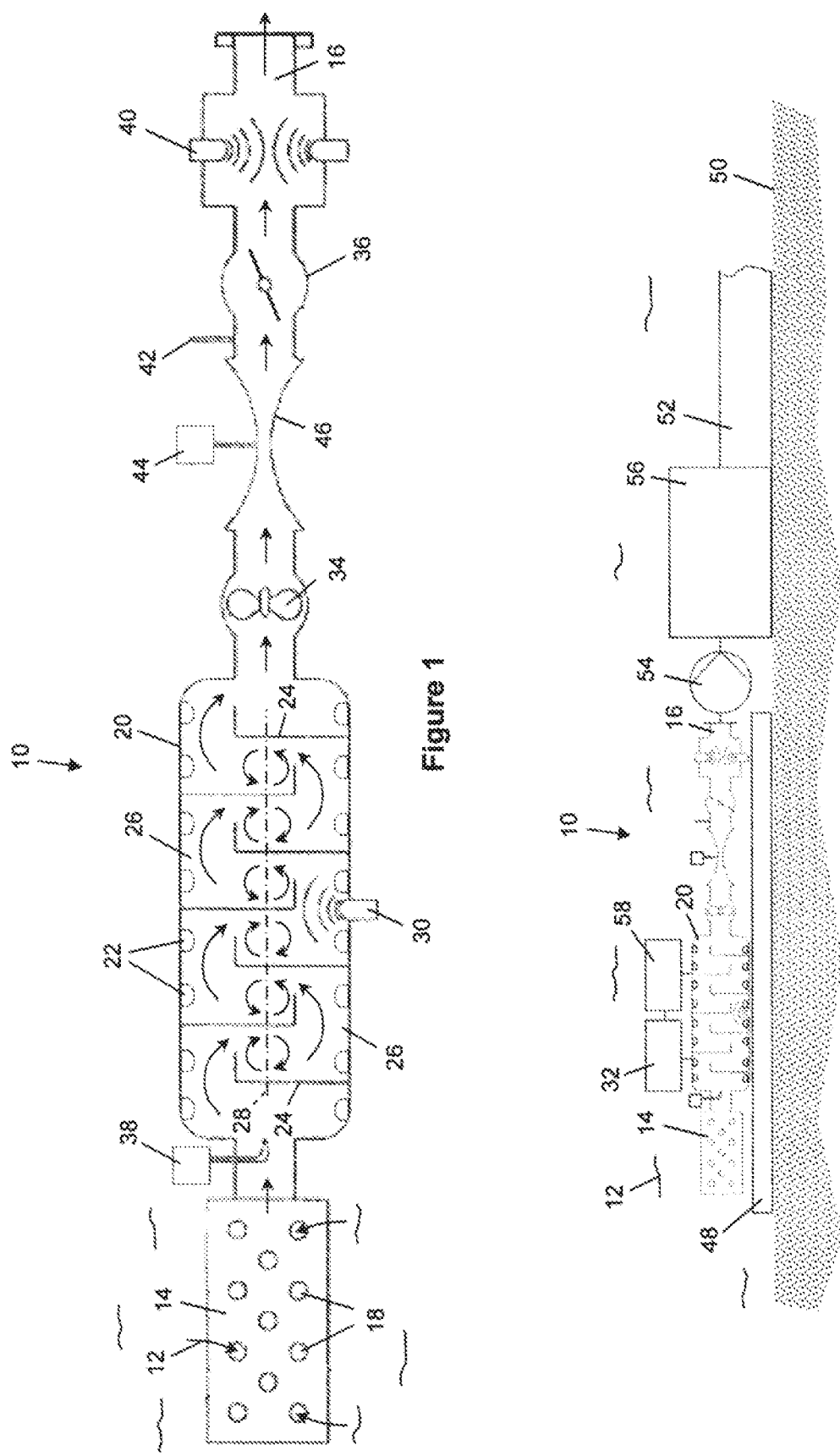

SANITISING SEAWATER AT SUBSEA LOCATIONS

This invention relates to the challenges of sanitising seawater at a subsea location, especially to suit the requirements of the subsea oil and gas industry.

Seawater is used often when a subsea oil and gas production system is being installed and operated. For example, a subsea pipeline may be flooded with seawater during installation to prevent collapse under hydrostatic pressure, as shown in WO 2016/166248. Also, a pipeline is routinely flooded with seawater to perform mandatory hydrotesting when testing its resistance to pressure during precommisioning.

Seawater may also be used in the production process, or in the operation of a subsea processing unit, for example in heat exchangers, or in a fluid injected into a subsea reservoir in order to boost production. For example, WO 97/30268 discloses a water injection facility comprising filtering tubes.

It is well known that seawater contains natural organisms that can settle, develop and grow to form deposits, hence generating 'biofouling'. Within a pipe, plugging or bore reduction may occur as a result. Also, microorganisms may accelerate the corrosion of steel, for example by producing sulphur. Such microorganisms need to be eliminated to protect the integrity of a pipeline or other subsea structure, or at least to be reduced substantially in number or effect.

Conventionally, mitigation of biofouling involves injecting biocide chemicals when flooding a pipeline or other subsea structure with seawater. Biocide may be injected in pellet form for small volumes, or from a chemical storage tank. However biocide agents add regulatory complexity and may fall foul of strict chemical discharge regulations in certain regions. For example, chemically-treated water removed from a pipeline after hydrotesting may not be environmentally friendly. This requires the complication of keeping the treated water separate from the surrounding seawater, and recovering the treated water from a location that may be deep underwater.

In WO 2014/044976 and WO 2014/044978, a water injection unit comprises chemical storage tanks and a membrane filtration system.

Systems known for ballast water treatment, for example in WO 2013/168745, may not be able to treat a sufficient volume of water for the purposes of the invention.

Generally speaking, it is known to use U light for water treatment. For example, US 2014/0263090 discloses a UV-type water purification system for use on land, for municipal use to treat domestic water supplies.

WO 2011/049546 discloses treatment of ballast water by UV light prior to disposal of the treated water into the sea. However, this arrangement is not suitable for underwater use at any significant depth because it employs tube lamps that would implode under hydrostatic pressure. US 2015/0210564 is also concerned with treatment of ballast water of a surface vessel.

In WO 2011/083307, UV radiation is used subsea to activate biocide agents after they have been mixed with seawater. This allows the use of environmentally-friendly chemicals that become biocidal only after exposure to UV. However, this technique still faces the challenge of storing and managing a sufficient volume of sanitising chemicals underwater, near the injection point.

Against his background, the invention resides in a method of sanitising seawater at a subsea location. The method comprises: exposing a flow of seawater in a treatment reactor to UV radiation that sanitises the seawater; and outputting the sanitised seawater from the reactor into a subsea structure. Unlike the aforementioned WO 2011/083307, the method of the invention uses UV radiation to sanitise the seawater directly, thereby reducing and potentially eliminating the need to rely on biocidal chemicals.

The invention enables the subsea location to be a seabed location, in which case the subsea structure may be on the seabed, or alternatively in proximity to the seabed. The subsea structure may, for example, be selected from: a pipeline; a wellhead; a riser; a manifold; a jumper pipe; water injection equipment; a reservoir management system; reservoir testing equipment; or a coolant system. The seawater is preferably filtered before being admitted into the reactor. A chemical may be injected into the flow of sanitised seawater downstream of the reactor to facilitate operation of the subsea structure.

UV radiation may be emitted from at least one UV lamp in the reactor, such as an LED lamp. The at least one UV lamp may be modified to accommodate hydrostatic pressure to thereby enable operation in a subsea environment of substantial depth underwater.

In contrast to the conventional UV lamps used in surface level treatment systems, which are not suitable for subsea use. The UV lamps may, for example, be pressure compensated UV lamps. Alternatively, or in addition, the UV lamps may be located in pressure resistant housings.

The flow of seawater in the reactor is suitably exposed to successive emitters of UV radiation. For example, the flow of seawater may be directed through a series of interconnected chambers of the reactor and may be exposed to UV radiation in each of those chambers. More generally, the flow of seawater may be directed along a serpentine path through the reactor, with turbulence being imparted deliberately to the flow as it follows the serpentine path.

The generation of turbulence is advantageous for several reasons. For example, the generation of turbulence ensures that the seawater together with any microorganisms and other contaminants entrained therein will be well mixed. In this way it is possible to ensure that all of the seawater that passes through the reactor will be exposed to sufficient UV radiation to ensure adequate sanitisation performance. In particular, turbulence may help to stir any residual mud from the seabed that remains in the flow of seawater after filtering. In addition, the generation of turbulence also minimises fouling of the UV radiation sources and the walls of the reactor, thereby increasing the efficacy of the reactor and reducing the requirements for maintenance, cleaning and replacement of the reactor.

The efficacy of sanitisation of the seawater in the reactor may be determined in various ways. In a preferred example, the efficacy of sanitisation may be determined by measuring UV radiation within the reactor. For example, the flow of seawater may be determined to be sanitised correctly if the measured UV radiation within the reactor is above an intensity threshold. In this way the efficacy of sanitisation may be determined in a simple and reliable manner by a monitoring system that requires minimal external intervention. UV radiation within the reactor may be measured by one or more UV detectors provided at any suitable locations within the reactor.

In addition, the flow rate of the seawater may also be used in determining the efficacy of sanitisation. For example, the flow of seawater may be determined to be sanitised correctly if the measured UV radiation within the reactor is above an intensity threshold and the flow rate of the seawater is within an expected range. The flow rate of the seawater may be measured by a flow meter, which may be located within the reactor or alternatively upstream or downstream of the reactor.

Alternatively, or in addition, the efficacy of sanitisation may be determined by direct monitoring of the operational status of the emitters of UV radiation. For example, the efficacy of sanitisation may be determined in dependence on the number of emitters of UV radiation that are active or in dependence on the power consumption of the emitters of UV radiation.

Alternatively, or in addition, the efficacy of sanitisation may be determined by removing a sample of the sanitised seawater downstream of the reactor. Another approach is to inject a tracer fluid into the flow of seawater upstream of the reactor and then, downstream of the reactor, to sense transformation of the tracer fluid due to exposure of the tracer fluid to the UV radiation in the reactor.

In response to the determined efficacy of sanitisation, adjustments may be made to the flow rate of the flow of seawater through the reactor and/or to the intensity of UV radiation to which that flow is exposed in the reactor. For example, if the measured UV radiation within the reactor falls below an intensity threshold and/or the measured flow rate of the seawater exceeds a flow rate threshold then the sanitisation system may respond by automatically increasing the intensity of the UV radiation within the reactor and/or decreasing the flow rate of the seawater. The intensity of the UV radiation may, for example, be increased by activating additional emitters of UV radiation. The flow rate of the seawater may, for example, be decreased by reducing the speed of a pump and/or by operating a valve to restrict the flow of seawater.

The inventive concept also embraces a device that is suitable for sanitising seawater at a subsea location of substantial depth underwater. The device comprises: a treatment reactor that contains at least one emitter of UV radiation for sanitising seawater flowing along a flow path extending through the reactor; and an outlet downstream of the reactor for outputting the sanitised seawater from the reactor. A filtration unit is preferably disposed upstream of the reactor.

The reactor may contain a series of emitters of UV radiation extending along the flow path. The or each emitter is suitably arranged to emit UVC radiation at a wavelength of from 100 nm to 280 nm. The or each emitter may be a UV LED lamp, and may be modified to accommodate hydrostatic pressure, for example by being pressure-compensated and/or by being located in a pressure resistant housing.

The flow path may extend through a series of interconnected chambers of the reactor, and each chamber may contain at least one emitter of UV radiation. The chambers are conveniently defined by baffles that extend inwardly from at least one side wall of the reactor in a direction transverse to the flow path. Such baffles may, for example, extend inwardly from opposed sides of the reactor in alternation. The baffles are preferably configured to impart turbulence to the flow of seawater within the reactor.

At least one of the baffles may comprise a projecting portion that extends outwardly from a main body of said baffle in a direction towards an adjacent baffle. The projecting portion of the baffle may enhance the generation of turbulence within the reactor, for example by causing the flow of seawater to temporarily accelerate as it passes the projecting portion and causing an abrupt change of direction around the projecting portion. The projecting portion of the baffle may also advantageously set up a region of tumbling flow downstream of the projecting portion, and also increase the residence time of the seawater in the reactor. The projecting portion may be generally planar in shape, and may have a sharp interface with the main body of the baffle. The projecting portion may be connected to the main body of the baffle adjacent to a distal end of the main body of the baffle such that the baffle has a generally L shaped profile.

The reactor suitably contains at least one sensor, being a UV detector. Alternatively, or in addition, the device may comprise at least one tracer injection port upstream of the reactor and at least one sensor downstream of the reactor, the sensor in that case being a tracer detector to sense the composition, state or concentration of a tracer injected through the or each tracer injection port. A controller may respond to signals from the or each sensor to vary the intensity of UV radiation in the reactor and/or to adjust the flow rate of seawater flowing along the flow path.

The flow velocity of seawater flowing along the flow path is suitably measured by a flowmeter in the flow path.

The flow velocity is suitably adjusted by a throttle valve in the flow path that is arranged selectively to restrict the flow path and may be capable of closing or blocking the flow path.

At least one sampling port and/or at least one chemical injection port may communicate with the flow path. Either or both of such ports are suitably positioned downstream of the reactor.

The device of the invention may conveniently be mounted on a skid or on a remotely operated vehicle (ROV). Mounting the device on a skid or an ROV may increase the ease of installation of the device, especially if the device is to be used at an inaccessible seabed location.

The device of the invention may be configured to be powered underwater by an on-board power supply and/or by an ROV. Powering the device in this manner may eliminate the need for the device to be physically connected to an external power source such as a surface power source.

The device f the invention may be in fluid communication subsea structure to receive treated seawater from the device through the outlet.

Embodiments of the invention provide a seawater sterilisation or sanitisation device for subsea use comprising: a seawater inlet comprising a filter; a treatment reactor that comprises at least one UV light, and an outlet.

The UV light is preferably UVC light that outputs a wavelength of 100 nm to 280 nm.

The UV light may be pressure-compensated and/or located in a pressure resistant housing.

The treatment reactor may comprise at least one UV detector. The outlet suitably comprises at least one sensor for measuring treatment efficiency and may, for example, be fluidly connected to a subsea pipeline or to a water injection wellhead.

The inlet may comprise a filter and may further comprise at least one injection port to inject a tracer that is modified by the action of UV. For this purpose, the inlet injection port may be connected to a tracer storage tank and injection pump.

The device may comprise at least one sampling port. Baffles may divert the flow of seawater through the treatment reactor.

Conveniently, the device may be mounted on a skid or on an ROV, and may be configured to be powered underwater by an on-board power supply and/or by an ROV.

Embodiments of the invention also implement a method for sanitising seawater underwater, the method comprising: admitting seawater inside a reactor chamber: exposing the content of the reactor chamber to UV light; and evacuating treated seawater to an outlet. The method may further comprise: injecting tracer sensitive to UV at the inlet; and detecting tracer modification at the outlet.

In summary, UV lighting systems have proven to be effective for sanitisation of water and for destroying microorganisms to disinfect water. The invention uses UV light to kill microorganisms that cause corrosion or other problems, for example in subsea pipelines that are flooded for subsea precommissioning operations.

The invention provides a device that is designed to eliminate the use of biocide for conditioning and sterilising raw seawater, targeting sulphur-reducing bacteria.

The invention implements the principle that UV lighting systems are deployed subsea and are incorporated into the process of flooding a pipeline or other subsea equipment or structure to disinfect the incoming seawater, thereby potentially eliminating the use of biocide agents altogether.

Traditional technology utilised in process water treatment incorporates UV lamps embedded inside a pipe section to expose the passing water to UV for sanitisation. The flowing water has to be exposed completely to the UV light for a specific minimum time. However, traditional UV lamps are not suitable for use in high ambient pressure environments or therefore in subsea applications.

The invention provides a unique subsea UV exposure chamber utilising UV LED light technology. The LED lamps are suitably pressure compensated and/or located in pressure resistant housings for subsea use, allowing them to be exposed reliably to seawater in high-pressure environments with ambient hydrostatic pressures of 5,000 psi (344 bars) or higher, corresponding to depths in excess of 3000 metres.

Seawater may flow into and through the chamber by virtue of a pressure differential when self-flooding, or when pumped from a subsea source. Treated seawater may then flow from the chamber into a volume being flooded, such as a subsea pipeline, or into a subsea wellhead as part of a water infection system. In the absence of free flooding through the system, pumps may be used to drive and/or draw the flow of seawater through the system and to deliver chemicals and indicator fluids.

The system an be resident on a subsea ROV and/or on a seabed-resident processing skid. Electrical power can be supplied by an external source such as an ROV, or by an on-board battery system.

The outlet of the system may be fluidly connected underwater to a flowline or other structure either directly or through an intermediate hose. A conventional subsea connector can be used, for example a 'hot stab' connector.

Filtering incoming seawater is preferred as it reduces the introduction of bulk organics, sea life and debris and prevents the filtered-out components from entering the system. This improves the quality of seawater as it is processed and improves the efficiency and reliability of subsequent elements of the apparatus as the seawater is conditioned for its intended use.

Reducing bulk components of the incoming seawater so greatly reduces the energy required for sterilisation, hence lowering costs, reducing the size for the apparatus and/or increasing the capacity of the system. Additionally, filtering reduces fouling of hardware such as the UVC reactor components and sensors and of reservoirs associated with the end use of the conditioned seawater. Filtering also reduces the requirements for chemicals and indicators.

An indicator such as a tracer fluid sensitive to decomposition by UVC may be introduced upstream of the UVC reactor and measured downstream of the reactor as an indication of UVC dosage level to assure adequate treatment of targeted biological components. By introducing a UVC-sensitive indicator upstream of the reactor and then measuring the composition or quantity of the indicator post-reactor, it is possible to measure and record the effectiveness of the treatment. Provisions may also be made to take samples of the water post-reactor to perform laboratory tests of treated water incorporated into the system.

The UVC reactor may comprise a reactor compartment or multiple reactor compartments for treating water that may be contaminated by bacteria. Specifically, the reactor targets sulphur-reducing bacteria by means of exposure to UVC spectra at sufficient energy levels to achieve the required level of sterilisation an alternative to the use of various biocide agents or free oxygen. Preferred features include multiple arrays of pressure-tolerant LEDs arranged to ensure thorough and adequate exposure of the effluent to the requisite dosing level by imparting a sufficiently turbulent flow in combination with a geometry the ensures a uniform treatment of targeted organics.

UVC energy level sensing and monitoring devices may be incorporated and distributed within the LED arrays, such that the performance and condition of the arrays are known continuously during operation and logged. This provides a means of controlling the sterilising operation and provides assurance that dosage quality is being met during treatment.

A water control feature may be added to control the flow rate of seawater. This may be used to control the process ensuring that is falls within the operating parameters for the reactor system and also within the required parameters for the facility being serviced by the provision of treated water. Such parameters may include flooding rates, delivery rates and/or pigging velocities.

The invention provides a special flooding chamber to facilitate UV sanitisation of seawater, for example as may be used for hydrotesting a pipeline. For this purpose, the chamber has subsea pressure-rated UV lamps suitable for use under the hydrostatic pressure of deep water. The invention mitigates the problem of biofouling due to microorganisms and avoids or mitigates the use of biocides and chemical agents.

By virtue of the invention, seawater may be sterilised or sanitised at a subsea location by exposing a flow of seawater in a treatment reactor to UV radiation that sanitises the seawater directly by killing a high percentage of the microorganisms that enter the reactor (and preferably at least substantially all microorganisms that enter the reactor) without the addition of sanitising chemicals. The sanitised seawater may then flow from the reactor into a subsea structure such as a pipeline or a wellhead.

The flow of seawater may be exposed to successive emitters of UV radiation such as pressure-compensated LEDs. The efficacy of sanitisation may be determined by injecting a tracer fluid into the flow of seawater upstream of the reactor. Transformation of the tracer fluid due to its exposure to the UV radiation may be sensed or measured downstream of the reactor and used to control the sanitisation process.

In order that the invention may be more readily understood, reference will now be made, by way of example, to the accompanying drawings in which:

FIG. 1 is a schematic side view in longitudinal section of a sanitising unit in accordance with the invention; and FIG. 2 is a schematic side view of the sanitising unit of the invention connected to a subsea installation.

Referring firstly to FIG. 1 of the drawings, a sanitising unit 10 of the invention draws in seawater 12 continuously through an inlet 14 shown to the left in this view and expels treated seawater continuously from an outlet 16 shown to the right in this view. The seawater 12 in the sanitising unit 10 is at the prevailing hydrostatic pressure, which corresponds to the depth in the sea at which the sanitising unit 10 is operating. This may be in deep or ultra-deep water in excess of 3000 m in some applications.

In this example, the inlet is defined by a filtration unit 14 that draws in seawater 12 through holes 18 and removes bulk organics, sea life and debris from the incoming flow.

After passing through the filtration unit 14, the flow of filtered seawater 12 enters a treatment reactor 20 that contains a longitudinally-extending series or array of pressure-compensated UV lamps 22. Successively, the lamps 22 expose the seawater 12 flowing through the reactor 20 to UV radiation, preferably at one or more wavelengths in the UVC range of 100 nm to 280 nm.

As it flows through the reactor 20, the seawater 12 is exposed to UV radiation at an intensity and for a duration that are sufficient to kill substantially all microorganisms that remain in the seawater 12 after filtration. Unlike the aforementioned WO 2011/083307, UV radiation sanitises the seawater 12 directly without requiring prior addition of chemicals to the seawater 12 to effect sanitisation when activated by UV radiation.

To ensure ample exposure of the seawater 12 to UV radiation from the lamps 22, the reactor 20 contains a longitudinally-staggered array of baffles 24 that extend inwardly from opposed side walls of the reactor 20, inter-digitated in longitudinal alternation. Neighbouring baffles 24 define interconnecting chambers 26 between them that are each illuminated fully by at least an individual one of the lamps 22.

The baffles 24 each extend inwardly beyond a central longitudinal axis 28 of the reactor 20 so as to overlap with neighbouring baffles 24 in a direction transverse to that axis 28. The baffles 24 thereby define a labyrinthine channel along the reactor 20 that imposes a lengthy serpentine path on the flow of seawater 12 through the reactor 20 from one chamber 26 to the next. This increases the residence time of the seawater 12 in the reactor 20 and also increases the average intensity and cumulative total of UV radiation to which that seawater 12 is exposed.

In this example, the baffles 24 are generally angular and have sharp corners that impose sudden changes of direction upon the flow of seawater 12 and thereby promote turbulence in the flow of seawater 12. The resulting circulatory, tumbling movement of the seawater 12 in each chamber 26 exposes all of the seawater 12 in the reactor 20 to a dose of UV radiation that will kill microorganisms in the seawater 12 effectively. In this respect, it will be noted that there is no possibility for any of the seawater 12 to flow smoothly on a central path through the reactor 20. Consequently, no seawater 12 will be shielded significantly from the UV radiation emitted by the lamps 22, for example as a result of turbidity of intervening seawater 12.

As shown in FIG. 1, each baffle 24 comprises a projecting portion that extends outwardly from a main body of said baffle 24 in a direction towards an adjacent baffle 24. The projecting portions are generally planar, and are connected to the main bodies of the baffles 24 adjacent to the distal ends of the main bodies such that each baffle 24 has a generally L shaped profile. The projecting portions of the baffles 24 enhance the generation of turbulence within the reactor 20, for example by causing the flow of seawater 12 to temporarily accelerate and then suddenly change direction as it passes the projecting portions, and also set up regions of tumbling flow downstream of the projecting portions.

Individually and collectively, these various measures ensure that substantially all microorganisms in the seawater 12 are killed before the seawater 12 exits the reactor 20. However, various other measures may be taken to monitor and control the sanitisation process and to verify correct operation of the sanitising unit 10, which as noted may be operating remotely at great depth beyond diver intervention. Those other measures will now be described. It will be apparent that they may have benefit both individually and in combination.

Firstly, the reactor 20 contains at least one UV detector 30 incorporated among the array of lamps 22 to sense and to monitor the performance and condition of the array. This allows the sanitisation process to be controlled by a controller 32, shown in FIG. 2, to ensure that an appropriate dosage of UV radiation is being applied to the seawater 12 in the reactor 20.

For example, if the array of lamps 22 is emitting less UV radiation than previously, perhaps due to failure of an individual lamp 22 or fouling with an accumulation of fine particles entrained in turbid seawater 12, the controller 32 can respond appropriately by adjusting other process control parameters. One approach would be to increase the intensity of UV radiation, for example by activating additional lamps 22 of the array. Another approach would be to reduce the flow rate of seawater 12 through the reactor 20 to increase the residence time of seawater 12 in the reactor 20.

The flow rate of seawater 12 through the reactor 20 is suitably measured by a flow meter 34 that outputs a flow rate signal to the controller 32. The controller 32 responds by controlling the flow rate using a throttle valve 36, exemplified here by a butterfly valve, in the flow path that extends through and beyond the sanitising unit 10.

Upstream of the reactor 20, a tracer fluid is injected into the filtered seawater 12 through a port that communicates with a pumped tracer fluid supply 38. Turbulent flow within the reactor 20 mixes the tracer fluid thoroughly with the seawater 12.

Aside from a small proportion of the tracer fluid, the liquid entering the reactor 20 is entirely seawater 12. In particular, no chemical is added to the seawater 12 upstream of the reactor 20 with the objective of that chemical sanitising the seawater 12, whether under the influence of UV radiation in the reactor 20 or otherwise.

The tracer fluid is selected to be transformed to a predictable extent by the UV radiation in the reactor 20, for example by decomposition. The extent of transformation may thereby serve as a measure of the effectiveness of UV exposure experienced by the seawater 12 that entrains the tracer fluid and flows through the reactor 20.

For this purpose, the compositor, state or concentration of the tracer fluid following transformation is detected by a trace detector 40 downstream of the reactor 20, in this example immediately upstream of the outlet 16. The controller 32 monitors signals from the trace detector 40 and can respond appropriately to fluctuations or trends by adjusting process control parameters such as those exemplified above.

Optionally, a sampling port 42 downstream of the reactor 20 allows samples of the processed seawater 12 to be taken, for example by a visiting ROV, to perform laboratory tests on that seawater 12 to check for compliance with standards.

One or more chemicals may be injected into the flow of sanitised seawater 12 through a port that communicates with a pumped chemical supply 44. In this example, the port is in a venturi throat 46 that accelerates the flow of sanitised seawater 12 to promote effective mixing with the injected chemical. Such chemicals may be added for various purposes that facilitate the operation of downstream subsea equipment or structures, including: corrosion inhibition; oxygen scavenging; pH modification; hydrate inhibition; paraffin treatment; asphaltene treatment; scale treatment; flow enhancement; gelling: mineral treatment; and/or controlling the growth of any residual biological organisms.

FIG. 2, which is not to scale, shows the sanitising unit 10 in a possible context of use. Here, the sanitising unit 10 is mounted on a skid 48 that is positioned on the seabed 50 beside a pipeline 52 that also lies on the seabed 50.

In this example, a pump 54 disposed between the outlet 16 of the sanitising unit 10 and a terminal module 56 at an end of the pipeline 52 drives the flow of seawater 12 from the sanitising unit 10 into the pipeline 52. Thus, the pump 54 draws seawater through the sanitising unit 10 from the filtration unit 14, through the reactor 20 and out through the outlet 16.

FIG. 2 also shows that the skid 48 supports a power supply 58 including an on-board battery that serves as a source of power for the controller 32 and for the sensors, pumps and actuators that are required to operate the sanitising unit 10. Optionally, the power supply 58 may also power the pump 54 or the pump 54 may be powered from another source.

The pipeline 52 is merely an example of a subsea structure or equipment that may receive treated seawater 12 from a sanitising unit 10 of the invention. Other examples include: wellheads; risers; manifolds; jumpers; water injection equipment; reservoir management systems; reservoir testing equipment; and/or coolant systems.

Various types of tracers and various corresponding trace detecting or sensing principles can be used in the invention. For example, dyes and pigments may be degraded or otherwise transformed by UV radiation. Such solutions are preferred for use in seawater.

The use dye or pigment allows the trace detector 40 to employ a simple sensor such as a wavelength sensor that receives a light beam shone through the flow to measure changes in the colour, or the intensity of colour, of the dye or pigment injected upstream of the reactor 20. For instance, a dye may become fluorescent when exposed to UV radiation in the reactor 20 and such fluorescence may persist for long enough after exposure to UV radiation to be sensed by the trace detector 40 downstream of the reactor 20.

Some polymers may be cured by exposure to a specific wavelength of UV radiation. Thus, for example, polymer-based inks, injected upstream of the reactor 20 as liquid droplets, could be cured by UV radiation in the reactor 20 to form solid particles. The concentration of such particles can be detected by a density meter or flowmeter serving as the trace detector 40.

Harmless bacteria may be injected as a tracer and killed by the effect of UV radiation in the reactor 20. An example of a bacterium is *Pseudomonas fluorescens*, which is known for creating biosensors as its fluorescence depends on its heath and growth. Such a tracer may be used in conjunction with a sampling system to recover and analyse treated water and also with a light sensor in the trace detector 40.

Another tracer approach is to inject a dye that reacts to any residual bacteria downstream of the reactor 20 and then to use the trace detector 40 to monitor changes in the dye resulting from exposure to those bacteria.

Ozone is known to be a UV tracer but is less preferred for the purposes of the invention as it works poorly with UVC radiation. A gas tracer is complex to use in water, for example due to gas pockets being trapped in the reactor 20 and not reaching the trace detector 40, and especially under the hydrostatic pressure of deep water.

Many other variations are possible within the inventive concept. For example, the skid 48 could instead be integrated with or carried by, and powered by, an unmanned underwater vehicle such as an ROV that is connected to the surface via a power umbilical. Similarly, power could instead be provided by an ROV that visits and connects to the sanitising unit 10.

An ROV could power the sanitising unit 10, if separate, via a flexible cable. Similarly, the sanitising unit 10 could communicate fluidly with a subsea structure such as the pipeline 52 via a flexible hose. Consequently, it is not necessary for an ROV that supports the sanitising unit 10 or that provides power to the sanitising unit 10 to rest on the seabed 50.

A pump could instead, or additionally, be provided within the sanitising unit 10 or at an upstream end of the sanitising unit 10. Multiple pumps could be provided in series, for example a high-volume low-pressure pump and a low-volume high-pressure pump. Treated seawater could be stored temporarily in one or more reservoirs or accumulators before being injected into a subsea structure.

It may be possible to omit a pump if the pipeline 52 or other volume downstream of the sanitising unit 10 free-floods under hydrostatic pressure and so can draw seawater 12 through the sanitising unit 10 under differential pressure.

The invention claimed is:

1. A method of sanitising seawater at a subsea location, comprising:
    directing a flow of seawater along a serpentine path through a treatment reactor;
    imparting turbulence to the flow of seawater as it follows the serpentine path;
    exposing the flow of seawater in the treatment reactor to UV radiation that sanitises the seawater; and
    outputting the sanitised seawater from the treatment reactor into a subsea structure;
    wherein the serpentine path is defined by a plurality of baffles that that divide the treatment reactor into a series of interconnected chambers; each baffle of the plurality of baffles comprising a main body that extends inwardly from a sidewall of the treatment reactor and a projecting portion that extends outwardly from the main body in a direction towards an adjacent baffle in an L-shaped configuration.

2. The method of claim 1, where the subsea location is a seabed location.

3. The method of claim 1, wherein the subsea structure is selected from: a pipeline; a wellhead; a riser; a manifold; a jumper pipe; water injection equipment; a reservoir management system; reservoir testing equipment; and a coolant system.

4. The method of claim 1, comprising determining an efficacy of sanitisation of the seawater in the treatment reactor.

5. The method claim 4, comprising determining the efficacy of sanitisation by measuring the UV radiation within the treatment reactor.

6. The method of claim 4, comprising determining the efficacy of sanitisation by direct monitoring of an operational status of at least one emitter of the UV radiation.

7. The method of claim 4, comprising determining the efficacy of sanitisation by:
    injecting a tracer fluid into the flow of seawater upstream of the treatment reactor; and downstream of the treatment reactor, sensing transformation of the tracer fluid due to exposure of the tracer fluid to the UV radiation in the treatment reactor.

8. The method of claim 4, comprising, in response to the determined efficacy of sanitisation, adjusting a flow rate of the flow of seawater through the treatment reactor and/or adjusting an intensity of the UV radiation to which the flow of seawater is exposed in the treatment reactor.

9. A device for sanitising seawater at a subsea location, comprising:
a treatment reactor that contains at least one emitter of UV radiation for sanitising the seawater flowing along a serpentine path extending through the treatment reactor, the at least one emitter of UV radiation being a UV LED lamp that is modified to accommodate hydrostatic pressure; and
an outlet downstream of the treatment reactor for outputting the sanitised seawater from the treatment reactor;
wherein the treatment reactor comprises a plurality of baffles that divide the treatment reactor into a series on interconnected chambers through which the serpentine path extends, the plurality of baffles being configured to impart turbulence to a flow of seawater as it follows the serpentine path, each baffle of the plurality of baffles comprising a main body that extends inwardly from a side wall of the treatment reactor and a projecting portion that extends outwardly from the main body in a direction towards an adjacent baffle in an L-shaped configuration.

10. The device of claim 9, wherein the main body of each baffle extends inwardly in a direction transverse to the serpentine path.

11. The device of claim 9, wherein the treatment reactor contains at least one sensor, being a UV detector.

12. The device of claim 9, further comprising at least one tracer injection port upstream of the treatment reactor and at least one sensor downstream of the treatment reactor, the at least one sensor being a tracer detector to sense a composition, state or concentration of a tracer injected through the at least one tracer injection port.

13. The device of claim 11, further comprising a controller that is responsive to signals from the at least one sensor to vary intensity of UV radiation in the treatment reactor and/or to adjust flow rate of the seawater flowing along the serpentine path.

14. The device of claim 9, further comprising a flowmeter in the serpentine path.

15. The device of claim 9, further comprising a throttle valve in the serpentine path, arranged selectively to restrict or to close the serpentine path.

16. The device of claim 9, mounted on a skid or on a remotely operated vehicle (ROV).

17. The device of claim 9, configured to be powered by an on-board power supply and/or by a remotely operated vehicle (ROV).

18. The device of claim 9, in fluid communication with a subsea structure to receive the sanitised seawater from the device through the outlet.

* * * * *